Figure 1:
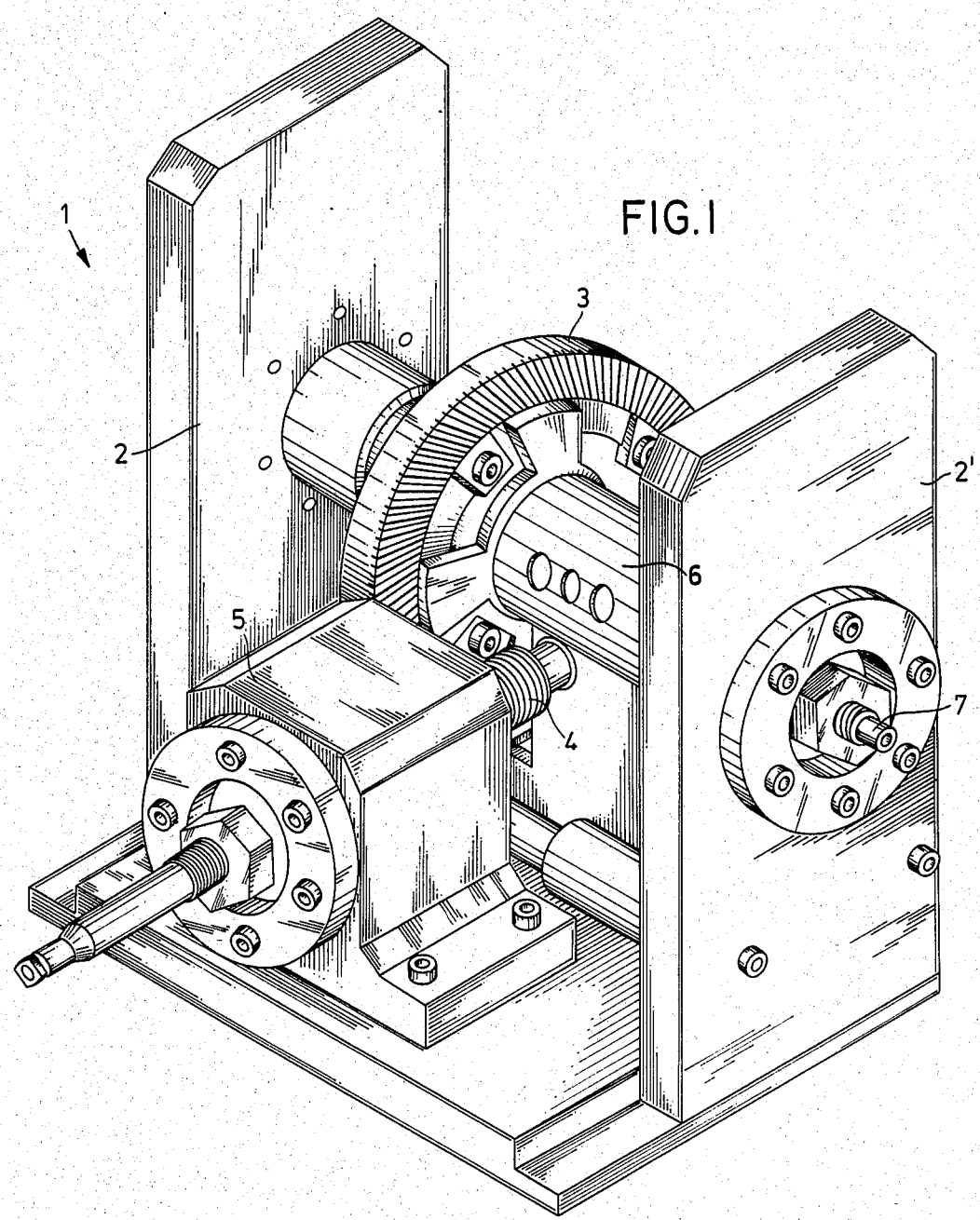

United States Patent [19]
Goldowsky

[11] Patent Number: 4,528,862
[45] Date of Patent: Jul. 16, 1985

[54] PRECISION GEAR MOUNT

[75] Inventor: Michael P. Goldowsky, Valhalla, N.Y.

[73] Assignee: North American Philips Corporation, New York, N.Y.

[21] Appl. No.: 563,344

[22] Filed: Dec. 20, 1983

[51] Int. Cl.³ .............................................. F16H 55/18
[52] U.S. Cl. ....................................... 74/409; 74/425; 74/440
[58] Field of Search ........................ 74/409, 425, 440

[56] References Cited

U.S. PATENT DOCUMENTS

| | | | |
|---|---|---|---|
| 2,996,929 | 8/1961 | Lazarowicz | 74/409 |
| 3,038,346 | 6/1962 | MacFarland | 74/409 |
| 4,305,307 | 12/1981 | Kiunke | 74/409 |
| 4,433,755 | 2/1984 | Ohtomi | 74/409 |
| 4,466,300 | 8/1984 | Takahashi | 74/425 |
| 4,487,087 | 12/1984 | Johnstone | 74/409 |
| 4,492,018 | 1/1985 | Rode | 74/409 |
| 4,493,571 | 1/1985 | Potter | 74/409 |

Primary Examiner—Henry C. Yuen
Attorney, Agent, or Firm—Paul R. Miller

[57] ABSTRACT

A gear arrangement is provided for precisely driving a goniometer in an X-ray apparatus with zero backlash. This arrangement involves structure for maintaining a preload between a driving pinion gear and a spiroid gear rotating an output shaft. The preload structure may be formed by way of a diaphragm, a finger diaphragm, or a roller bearing acting in combination with a finger diaphragm.

7 Claims, 5 Drawing Figures

PRECISION GEAR MOUNT

The present invention is directed to a gearing structure that enables absolute positioning accuracy with zero backlash. In particular, the gearing structure of the present invention achieves significant accuracies in the arc-second range for angular adjustments used in goniometers for X-ray diffractometers.

An X-ray goniometer uses precise spiroid gearing. Commercially available spiroid gearboxes have been found to be unsatisfactory since backlash values are very large, pinion shaft bending occurs, low axial stiffness ball bearings are employed, and low torsional stiffness of an output shaft causes unacceptable output rotation. Moreover, it has been found that techniques used to preload the pinion gear onto a spiroid gear to remove backlash are not adequately stable.

In particular, it has been found that the drive pinion gear and the spiroid gear providing rotation to an output shaft must be preloaded together. In such structures an axial preload without backlash is required. Moreover, gear perpendicularity is a problem since when the gear is mounted directly to a diaphragm, problems occur from the inability to maintain the diaphragm flat or stable enough. Thus, unsatisfactory results have been found because of axial runout of the spiroid gear could only be held to about 1 mil. Such a runout produces an unacceptable output error of 0.02°.

The present invention provides a gearing structure for overcoming these deficiencies and achieving absolute positioning accuracy with zero backlash.

This invention is achieved by providing an engaging structure to maintain precise engagements between a gear wheel, such as the spiroid gear wheel of these devices, and a driving pinion gear.

A preferable arrangement has been obtained by use of a roller bearing, or roller, to force engagement of the driving pinion gear and spiroid gear wheel. Such a structure ensures near zero backlash under all conditions of gear and pinion runout by permitting smooth sliding of the gear sleeve. Runout is used in this application to define pinion radial eccentricity or gear axial eccentricity depending on the circumstance. This engaging structure of the present invention with the additional use of a finger diaphragm at a diametrically opposed position of the gear wheel achieves little or no cocking moment on the structure. In such an arrangement the roller provides a preload and the finger diaphragm transmits torque.

An additional arrangement of the present invention involves the use of a disk-like diaphragm to form the axial force between the pinion gear and the gear wheel. Axial deflection of the diaphragm maintains a relatively constant preload on the pinion, and compensates for minor axial runout of the gear wheel and pinion gear, as well as differential thermal expansion of the gearbox.

The use of a finger diaphragm structure has also been found to achieve certain improvements over the disk-type diaphragm. Such a finger diaphragm has four equally spaced fingers which are essentially cantilever springs acting on the gear wheel and converting torsional loads to tension and compression forces in the finger members. A very high torsional stiffness is obtained because the fingers do not significantly stretch or compress.

Figure 4A:
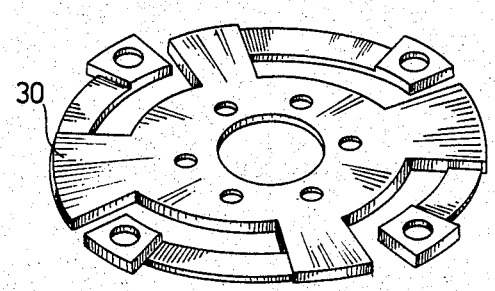
Figure 4B:
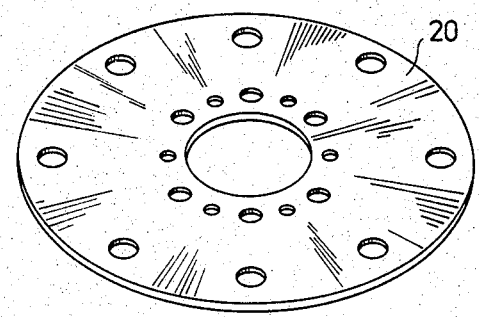
Figure 2:
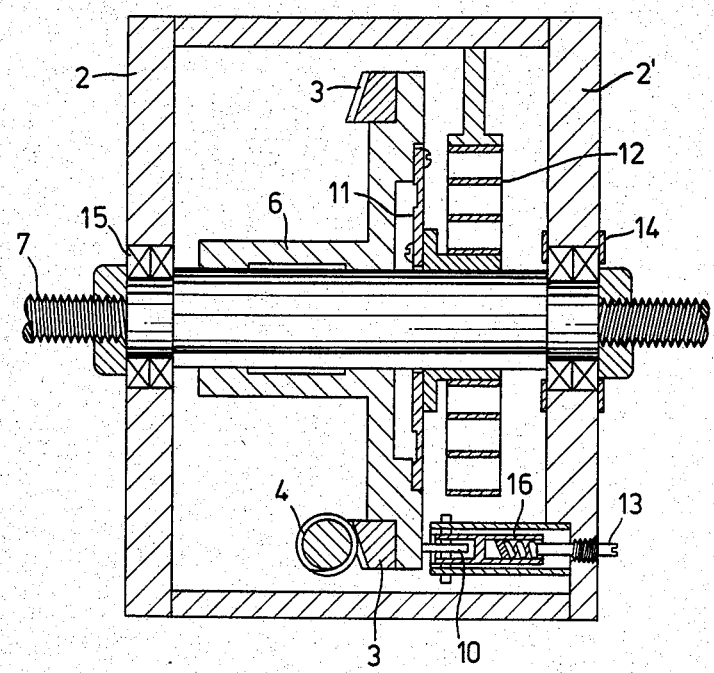
Figure 3:
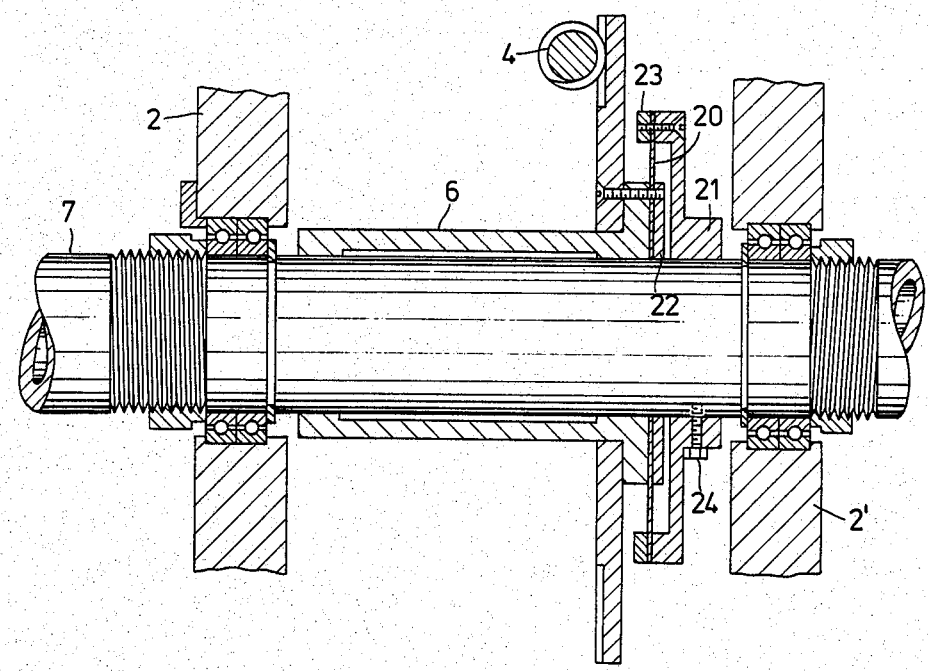

The structure of the present invention may be more clearly seen by reference to the drawing figures which illustrate without limitation various aspects and embodiments of the present invention, and wherein FIG. 1 illustrates a gearbox for use in the present invention, FIG. 2 illustrates a schematic arrangement of one embodiment of the present invention, FIG. 3 partially illustrates a further embodiment of the present invention, and FIG. 4a illustrates a finger diaphragm type of structure, while FIG. 4b illustrates a disk diaphragm type of structure for the present invention.

The gearbox arrangement of the present invention is illustrated in FIG. 1. Such a gearbox structure has been found to be extremely useful in adjusting a goniometer in X-ray apparatus.

The gearbox arrangement 1 consists of an output shaft 7 on which is mounted a spiroid gear wheel 3 being driven by a pinion gear 4. The pinion gear 4 is driven by a motor 5. The output shaft 7 is mounted through two walls 2 and 2' forming a part of the gearbox. The gear wheel 3 is mounted on a longitudinal cylinder 6 as shown in FIGS. 2 and 3, for example. The longitudinal sleeve or cylinder 6 has a few tenths of a mil diametric clearance with the output shaft 7, but maintains sliding motion with respect to the shaft 7. Moreover, the longitudinal sleeve 6 keeps the gear wheel 3 square to the shaft while providing axial motion capability. Maintenance of the gear wheel 3 perpendicular to the shaft 7 is essential for high accuracy since it affects the amount of runout of the gear wheel 3.

A two hundred inch-ounce stepper motor has been used for the motor 5 since the efficiency of spiroid gearing can be poor. That is, for a 360-to-1 ratio the efficiency of the spiroid gearing is about 10% thereby requiring a motor having ten times more torque than theoretically calculated. Use of a stepper motor simplifies the control system. Alternatively, a servo-motor can be employed where speeds are much higher. The step motor can be pulsed at 3,000 pulses per second for maximum speed or pulsed one at a time. Since the step size of the stepper motor may be about 1.8°, the output shaft 7 will turn about 0.005° or 18 arc-seconds. With such fine resolution, gear accuracy can be crucial thereby requiring the preloading structure of the present invention.

FIG. 2 illustrates in a preferred embodiment of the present invention that the gear wheel 3 is mounted on the longitudinal sleeve 6 to be driven by the pinion 4. An axial preload force is provided between the gear wheel 3 and pinion gear 4 by way of the roller 10 such that the gear wheel 3 transmits torque to the shaft 7 without backlash and with a minimal axial runout. This occurs by way of the roller 10 acting against the gear wheel 3 to provide the preload between the pinion gear 4 and gear wheel 3. A finger diaphragm 11 is also provided to transmit torque. The finger diaphragm 11 is axially compliant to allow the gear wheel 3 to freely slide into mesh with the pinion gear 4.

The arrangement of FIG. 2 is provided with the output shaft 7 being supported at each end with preloaded, back to back angular contact ball bearings 15 which are clamped with the bearing clamps 14, for example.

The structure of FIG. 2 enables the roller 10 to provide a preload while the finger diaphragm 11 transmits torque. This essentially eliminates cocking moments on the sleeve or longitudinal cylinder 6 so that it can slide smoothly. The roller 10 is positioned opposite the pinion gear 4 to apply the preload force axially in an amount of ten pounds, for example. With the roller 10 opposite the pinion gear 4 there is no cocking moment on the longitudinal sleeve 6 to induce a lock-up condition. The finger diaphragm 11 transmits output torque to the shaft, but is not used to apply an axial force to the longitudinal sleeve 6. The low axial stiffness of the finger diaphragm 11 is most desirable in this construction. The use of the roller 10 has the added advantage that preload forces can be conveniently adjusted after the gearbox is assembled by way of the preload adjustment screw 13.

The roller 10 is connected to the preload adjustment screw 13 by way of a coil spring 16 in a cylinder. The coil spring 16 is adjusted by way of the adjustment screw 13 to provide the desired preload force.

A torsion spring 12 is also provided instead of a counterweight to help offset an unbalanced load on the output shaft. This reduces the motor torque required.

FIG. 3 illustrates another construction of the precision gear mount of the present invention in which a diaphragm 20 is utilized to provide the required preload. The axial deflection of the diaphragm 20 maintains a relatively constant preload on the pinion gear 4 and compensates for minor axial runout of the gear wheel 3 and pinion gear 4. Differential thermal expansion of the gearbox is also compensated by way of the axial deflection of the diaphragm.

Because the gear segment 3 is fixed to the longitudinal cylinder 6, cocking relative to the shaft, which would give rise to axial runout, is minimized. The longer the longitudinal cylinder, the less cocking results for a given amount of output shaft diameter clearance.

In this arrangement the longitudinal cylinder 6 has a few tenths of a mil diametric clearance with the output shaft 7. The diaphragm 20 is rigidly attached to the longitudinal cylinder by way of the inside diameter clamp 22. The outside diameter clamp 23 fixes the diaphragm 20 rigidly to the hub member 21. This hub member is moved to the left to apply the axial load to the gear wheel 3, such that the gear wheel 3 is then pressed against the pinion gear 4 with the required preload. The hub member 21 is then locked to the shaft by way of screw 24, for example. The axial deflection of the diaphragm 20 maintains a relatively constant preload on the pinion gear.

In operation the pinion gear is a worm gear that rotates the gear wheel 3 by way of the motor 5 in FIG. 1. The gear torque is transmitted through the diaphragm 20 with a required zero backlash, and the diaphragm 20 then transmits the torque to the hub member 21 which further transmits it to the output shaft 7.

The disk diaphragm of FIG. 3 is a full disk arrangement, such as that illustrated in FIG. 4b. The finger diaphragm, such as used in the arrangement of FIG. 2, may be seen by reference to FIG. 4a.

This finger diaphragm 30 can be used in place of the full disk diaphragm to preload the gear wheel 3 onto the driving pinion gear 4 to the drive of the output shaft 7. The finger diaphragm 30 is constructed of titanium and has four equally spaced fingers which are essentially cantilever springs. The four fingers of the diaphragm support the gear wheel 3 and convert torsional loads to both tension and compression forces in the finger members. Since the fingers do not significantly stretch or compress, a very high torsional stiffness is obtained.

The finger diaphragm 30 is of an order of magnitude less stiff axially than the full disk diaphragm and flexes while maintaining the preload force. The torsional and axial spring stiffnesses and buckling safety factor which determines the torsional capacity is a function of the finger geometry. Dimensions have been calculated for finger length, width and thickness to enable the spring to maintain a ten pound preload force while sustaining a nominal 4.5 foot pound torque load.

What is claimed:

1. A structure for a gearbox providing absolute positioning accuracy and zero backlash comprising
   an output shaft disposed for rotation,
   a longitudinal cylinder disposed concentrically over said shaft for sliding therewith,
   a spiroid gear wheel mounted on said longitudinal cylinder,
   a pinion gear for driving said gear wheel, and
   engaging means for providing a preload between said gear wheel and said pinion gear to maintain precise engagement therebetween.

2. A structure according to claim 1, wherein said engaging means includes at least one roller member acting on said gear wheel.

3. A structure according to claim 2, wherein said engaging means further includes a finger diaphragm acting on said gear wheel at a position diametrically opposed to said roller member.

4. A structure according to claim 3, wherein said engaging means further includes adjustment means for adjusting said preload on said roller member.

5. A structure according to claim 2, wherein said engaging means further includes adjustment means for adjusting said preload on said roller member.

6. A structure according to claim 1, wherein said engaging means includes a diaphragm acting on said gear wheel.

7. A structure according to claim 1, wherein said engaging means includes a finger diaphragm acting on said gear wheel.

* * * * *